United States Patent [19]
Kuchinski et al.

[11] Patent Number: 6,001,494
[45] Date of Patent: *Dec. 14, 1999

[54] METAL-CERAMIC COMPOSITE COATINGS, MATERIALS, METHODS AND PRODUCTS

[75] Inventors: Frank A. Kuchinski, Lancaster; John E. Peeling, Brodbecks, both of Pa.

[73] Assignee: Technology Partners Inc., Lancaster, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/801,208

[22] Filed: Feb. 18, 1997

[51] Int. Cl.$^6$ ..................................................... B32B 15/18
[52] U.S. Cl. .............................................. 428/653; 501/19
[58] Field of Search .................................................. 501/19

[56] References Cited

U.S. PATENT DOCUMENTS

| | | | |
|---|---|---|---|
| 2,898,236 | 8/1959 | Long et al. | 501/19 |
| 2,974,051 | 3/1961 | Moore | 501/19 |
| 2,975,072 | 12/1961 | Bryant et al. | |
| 3,093,208 | 6/1963 | Howe | |
| 3,127,951 | 4/1964 | Pierce | |
| 3,203,815 | 8/1965 | Michael | 501/19 |
| 3,209,438 | 10/1965 | Brown | |
| 3,209,862 | 10/1965 | Young | |
| 3,356,515 | 12/1967 | McGlothlin | 501/19 |
| 3,508,938 | 4/1970 | Jones | 501/19 |
| 3,706,579 | 12/1972 | Michael | 501/19 |
| 3,742,930 | 7/1973 | Ott | |
| 3,748,170 | 7/1973 | Michael | 501/19 |
| 3,761,293 | 9/1973 | Carini et al. | 501/19 |
| 3,772,043 | 11/1973 | Michael | 501/19 |
| 3,850,647 | 11/1974 | Bhat et al. | 501/19 |
| 4,113,665 | 9/1978 | Law et al. | |
| 4,930,678 | 6/1990 | Cyb | |
| 5,304,517 | 4/1994 | Casey et al. | 501/19 |
| 5,376,596 | 12/1994 | Tokuda et al. | |

*Primary Examiner*—Deborah Jones
*Assistant Examiner*—Darlene David
*Attorney, Agent, or Firm*—James Creighton Wray; Meera P. Narasimhan

[57] ABSTRACT

Metal-ceramic composite coatings provide refractory anti-corrosion flexible enamel coated products. Frit is made of silicon dioxide, sodium or potassium oxide, boron oxide, calcium oxide and zinc oxide, with possible other components. The frit is wet milled with clay and bentonite as a suspending agent, magnesium carbonate and sodium nitrates as electrolyte, boric acid a buffer, and water. Finely divided aluminum is blended after milling. A substrate is coated with the frit aluminum and clay mixture, which is heated and fused. The metal component coats the substrate and provides galvanic protection. The resulting coating is flexible and deforms with the substrate without delaminating or chipping. The coating is prepared by crushing, sieving, mixing and melting the frit components. The melt is tested by pulling, cooling and feeling a thread. The melt is fritted by pouring into water. The frit is dried, ground and sieved, and then wet milled with water, clay, bentonite and pH adjustors. Fine metal powder is added, and flowability is adjusted with water for spraying. Metal panels are cleaned and spray coated. The coating is dried, and then fired or baked, to provide the metal-ceramic composite flexible corrosion prevention coating.

5 Claims, No Drawings

METAL-CERAMIC COMPOSITE COATINGS, MATERIALS, METHODS AND PRODUCTS

BACKGROUND OF THE INVENTION

This invention concerns new coatings, coated products and coating compositions including frits and slips.

Needs exist for glass-like enamel coatings that are rugged and withstand impacts and bending, which resist delaminating, chipping and cracking and which, if chipped or cracked, provide continued protection and are reparable.

SUMMARY OF THE INVENTION

New corrosion-resistant coatings are metal-ceramic composite coatings which fulfill existing needs. In addition to high temperature resistance and corrosion resistance, the new coatings are field reparable and flexible. The coating can be applied to a metal substrate by spraying and then be made adherent by drying and firing with a hand-held propane torch or heat gun or in a furnace. Whether heat treated in a furnace or by a torch, the resultant coating is flexible and deforms with the substrate, without delaminating or chipping.

The above characteristics make the new coatings superior to existing metallic or ceramic coatings. Coating flexibility and cathodic protection make the new coatings better than pure ceramic coatings. The coatings are flexible and will not chip off, thus offering superior barrier protection against corrosion. If a portion of that barrier coating is removed and the underlying steel substrate is exposed, a cathodic protection mechanism inhibits corrosion of the substrate. Relative to purely metallic coatings, the new coatings provide superior performance due to the inherent high strength and environmental resistance of the ceramic phase.

Several factors make the new coating systems extremely valuable and easy to commercialize. The new coatings use existing "frit" and porcelain enamel manufacturing and application equipment. The new coatings are cost-competitive with aluminized steels and porcelain enamel coatings and expand the market for porcelain enamel-like coatings beyond the present volume of about 200,000,000 pounds of frit per year.

Coating thicknesses vary from about 1 to 10 mils. There are some variation in results based on composition and process parameters.

The invention provides new frits, coatings, processes and final coated articles.

Corrosion of combat and technical equipment, especially corrosion in vehicle exhaust systems, is an on-going problem, particularly in terms of maintenance. The innovative coatings provide corrosion protection over the temperature ranges from about 800° C. (1475° F.) adjacent to engines to about 200° C. (400° F.) further along the exhaust systems.

The new coating system has been a success and has offered higher temperature resistance than originally anticipated. It outperforms aluminized and stainless steels in both the salt spray (ASTM 117B–166 hours) and heat resistance tests (MIL-P-14105D) up to 400° C. In addition, the new coatings exhibit excellent mechanical shock resistance and impact resistance.

The invention provides an innovative unique series of coatings that can be applied to metal substrates for many purposes, including corrosion control in vehicle exhaust systems. The new metal-ceramic coating provides a 1–10 mil coating on a steel sheet, for example about 20 gauge or 0.040 in. steel. An iron aluminide discontinuous phase forms on the steel to aid adhesion and to provide corrosion resistance through galvanic action. The free aluminum particulate in the coating also provides cathodic protection to the underlying ferrous substrate. The metal powder and glass frit melt together, and the glass becomes a protectant for the metal particulate. Optimum ratios of metal to frit and metal of about 8% to 80% by weight are chosen. The glass frit is crushed or milled to a preferred particle size. Then the crushed frit is wet milled with clay and smaller amounts of bentonite, electrolytes and pH adjusters, forming a slip with a particle size so that about 10% remains on a 325 mesh screen when washed through with water. The frit crushed or uncrushed may be sold or may be packaged with clay and bentonite with or without electrolytes and pH adjuster for adding water and wet milling as a slip with the desired particle size. The slip may be sold wet or dried. Rheological additives may increase shelf life. Metal powder of a size in which 70% to 95% or more passes through a 325 mesh screen may be sold with the slip or with the frit for combining after wet milling or after re-wetting the dried slip. Metal powder may be sold combined with the frit for wet mixing with the clay and additives. Frit, metal powder, clay and additives may be sold together for adding water and wet mixing. Finally water is added to the desired consistency for the selected coating process, such as spraying, dipping or flow coating.

Cost-effective processing methods and the new engineered materials produce exhaust system coatings having corrosion resistance and heat resistance properties superior to currently used coatings. The new coatings can be manufactured and commercially applied on a cost competitive level with an aluminizing process for steels.

The new metal-ceramic composite coatings provide outstanding corrosion protection, including areas where the substrates are exposed. Similar to aluminized steels, the new coatings provide cathodic protection through sacrificial corrosion of the aluminum metal, followed by sacrificial corrosion of the FeAl intermetallic layer at the interface. However, in comparison to aluminized steels, the new approach outperforms conventional coatings. The concentration of aluminum is an order of magnitude greater. Protection is quicker and is extended for a longer period of time. Also, the presence of the glass affects the coating morphology and offers additional barrier protection to the substrate, therefore minimizing the surface area of exposed steel requiring galvanic protection. The new coatings are electrically conductive, which supports the galvanic protection theory.

In addition to excellent corrosion resistance, the metal-ceramic composite coatings are unaffected by heat resistance exposure at 400° C., and survives 600° C. tests. Other advantages of the metal-ceramic composite coatings include field reparability and excellent chip resistance. The resultant chip resistance makes the new coatings ideal for use by appliance manufacturers as chip-resistant porcelain enamels.

An enamel coating composition includes a frit or glass having (a) silicon dioxide, boron oxide, other glass former(s) or a combination of glass formers, and (b) lithium oxide, sodium oxide, potassium oxide, other Group I glass modifiers, or a combination of Group I glass modifiers. That composition is arrived at by mixing and melting, or otherwise producing a homogeneous amorphous material, the oxides, carbonates, hydroxides, nitrates, silicates, or a combination of other natural or artificial materials, e.g. silica, feldspar, soda ash, potash, lithium carbonate, sodium silicate waterglass, borax, boric acid, prefritted glasses, after considering the loss on ignition of such materials. The enamel composition can be sold in a fritted or powder form, such as powder produced through ball milling.

The coating composition may further include at least one of the four following types of materials: (a) magnesium oxide, calcium oxide, other Group II glass bridging modifiers, or a combination of Group II glass bridging modifiers, and (b) zinc oxide, titanium dioxide, other transition metal oxides, or a combination of transition metal oxides, (c) aluminum oxide, zirconium oxide, molybdenum oxide, tin dioxide, other intermediate glass oxides, or a combination of intermediate glass oxides, and (d) fluorospar, potassium silicofluoride, other fluorine containing fluxes, or a combination of fluorine containing fluxes. That composition is arrived at using the oxides, carbonates, hydroxides, nitrates, silicates, or a combination of other natural or artificial materials, e.g. silica, silicates, feldspar, sodium silicate waterglass, prefritted glasses, tetra ethyl orthosilicate, aluminum alkoxide, lime, nepheline syenite, zircon, potassium silicofluoride, clays, and aluminum fluoride, after considering the loss on ignition of such materials.

In one preferred embodiment the coating composition includes weight percentage ranges of about 10–80% $SiO_2$, 0–35% $B_2O_3$, 0–40% $P_2O_5$, 0–5% $V_2O_5$, 0–5% $Sb_2O_3$, 0–20% $Li_2O$, 0–30% $Na_2O$, 0–40% $K_2O$, 0–10% MgO, 0–25% CaO, 0–10% SrO, 0–20% BaO, 0–20% ZnO, 0–20% $TiO_2$, 0–10% $Cr_2O_3$, 0–10% $MnO_2$, 0–10% FeO, 0–10% CoO, 0–10% NiO, 0–10% CuO, 0–40% $Al_2O_3$, 0–20% $ZrO_2$, 0–5% $Mo_2O_3$, 0–20% $SnO_2$, and 0–10% Fluorine.

The coating composition may further include soluble or insoluble solids combined with the frit or glass to form a slip. The soluble or insoluble solids, also known as mill additions, may include suspending agent(s), electrolyte(s), opacifier(s), binder(s), refractory filler(s), deflocculant(s) and buffer(s). Those solids may be either mixed dry and be suitable for later additions of a liquid(s) to form the slip, or may be mixed wet, with water, alcohol, or other suitable solvent for producing the slip.

In one preferred embodiment, the coating composition includes by weight about 100 parts of frit or glass, about 2 to 10 parts clay, about 0.1 to 2 parts bentonite clay as an additional suspending agent and binder, about 0.1 to 2 parts magnesium carbonate and about 0.2 to 3 parts boric acid as a buffer.

The coating composition may further include reactive halogen containing materials mixed with the frit, other soluble or insoluble solids or the slip. The reactive halogen containing materials act as a coating flux, as a reactant with the particulate metal, or as a flux and reactant. The reactive halogen containing materials, such as but not limited to fluorospar, sodium silicofluoride, or potassium silicoflouride, are included in an amount from about 0 parts to about 20 parts by weight to about 100 parts by weight of frit.

The coating composition may further include metal particulate magnesium, aluminum, zinc, tin, other active or more refractory metals, such as boron, silicon, tungsten, copper, manganese, iron, nickel, cobalt, chromium and molybdenum, high alloys of all said metals, and mixtures of same, mixed with the frit, mill additions or slip. Particulates include equiaxed powders, fibers, chopped fibers, whiskers and flakes, included in an amount from about 8% to about 80% by weight of the combined weight of frit and metal particulate.

In one preferred embodiment of the coating composition, the conventional adhesion promoting oxides of cobalt, nickel and copper are not included in the frit composition or as mill additions. The composition further includes metal particulate magnesium, aluminum, boron, high alloys of all said metals, and mixtures of same, mixed with the frit, mill additions or slip. Particulates include equiaxed powders, fibers, chopped fibers, whiskers and flakes, included in an amount from about 8% to about 80% by weight of the combined weight of frit and metal particulate.

A method of making an enamel coating composition includes mixing and melting a frit or glass having (a) silicon dioxide, boron oxide, other glass former(s) or a combination of glass formers, and (b) lithium oxide, sodium oxide, potassium oxide, other Group I glass modifiers, or a combination of Group I glass modifiers with natural or artificial materials, e.g. silica, feldspar, soda ash, silicates, potash, lithium carbonate, borax, boric acid, prefritted glasses, after considering the loss on ignition of such materials.

The method may further include mixing any of the compositions described in the above and ongoing disclosure.

A method of coating a metal product includes mixing components, including a coating composition of a frit, metal particulate, water and mill additions, to produce a slip, adjusting the slip with water or mill additions for coating the metal product with the enamel coating composition, and firing the coated metal product, resulting in a metal product coated with metal and enamel. The enamel coating composition is applied by coating methods such as dipping, brushing, wet spraying, transfer decaling, flow coatings, air brushing, or other commonly used methods in the porcelain enamel or ceramic glaze industries. The slip mixture may include any of the compositions described in the above and ongoing disclosure. The coated metal part is preferably iron or an iron based alloy, including, but not limited to, steel, decarburized steel, enameling iron, interstitial free enameling steel, cast irons, eutectic alloys, stainless steels, aluminized steels, galvanized steels or iron-nickel alloys. The coated metal product is preferably fired at a temperature of 500–1000° C.

The present invention further includes the metal products produced using the compositions and methods described above and in the following detailed description and claims. In preferred embodiments, the metal products coated in accordance with the methods and compositions have at least one enhanced property, including, but not limited to, changes in aesthetics, color or gloss, enhanced abrasion, corrosion, oxidation, thermal or other environmental resistance, thermal shock resistance, mechanical shock and impact resistance, sound deadening or vibration control, stability against UV, IR or other electromagnetic radiation, controlled coefficient of thermal expansion, modification of surface roughness, elastic modulus or surface chemistry for adhesion or bonding to other materials, and alteration of electrical properties. The coated metal product is preferably subsequently fabricated by such methods as, but not limited to, cutting, bending, welding, shaping, forming, polishing or grinding, due to the flexibility and adherence of the said coating. The coated metal product may further include an inorganic, metallic, organic, or composite topcoat (coating). The topcoat is applied for a specific purpose, including, but not limited to, changes in aesthetics, color or gloss, enhanced abrasion, corrosion, thermal or other environmental resistance, water or liquid repellence, adhesion of other objects to the coated surface, lubricity, or alteration of electrical properties.

These and further and other objects and features of the invention are apparent in the disclosure, which includes the above and ongoing written specification, with the claims and the drawings.

DETAILED DESCRIPTION OF THE PREFERRED EMBODIMENTS

In the present invention, glasses are designed to meet specific end-use requirements. Important properties include viscosity parameters such as softening point, annealing point and glass transition temperature, coefficient of thermal expansion, chemical resistance, and surface tension. The economics of glass raw materials and processing costs are also major considerations with respect to achieving the desired properties for most applications.

Values are calculated for the above-referenced properties from weight percent oxide compositions. To begin a new glass design, an estimate of the required oxide composition is made. The calculated values for important properties are evaluated. If they are not within the limits thought to be desirable, one or more of the oxide levels are changed to recalculate a new composition. When the property values are within an acceptable range, the composition is obtained and smelted, and actual properties are measured. That glass becomes the starting point from which future changes are made though an iterative process until a glass that meets the properties of the intended use is obtained.

The required oxide composition is converted into a batch formula by applying yield factors for the various raw materials that contain the desired oxides. Weights are adjusted and balanced until the raw batch yields the correct oxide composition. The standard raw batch weight for lab smelts is 220 grams.

Raw materials are weighed in grams to two decimal places and are mixed thoroughly. The mixed batch is transferred to a steel beaker and from there to a 350 ml fused silica crucible. The intermediate step of transferring to a steel beaker is necessary, because in a series of smelts of similar compositions the same refractory crucible is often reused, and batch is poured into it while it is very hot.

The batch is melted in an electric furnace. For the first glass in a new series, the calculated smelting temperature (log 2 viscosity) is used. Smelting time is determined by periodically "pulling a thread" and checking for undissolved raw batch. In that process a 1/16" steel rod is dipped into the surface of the melted glass, heated until the glass adheres, then withdrawn smoothly and rapidly so that a "thread" of solidified glass 24 to 36 inches long is obtained. After cooling, the thread is examined visually and tactily by pulling it between the thumb and middle finger. If fully melted, the thread will be of uniform transparency and will feel smooth without knots or lumps along its length.

When it has been determined that the glass is fully melted, it is fritted by pouring it rapidly, but in a smooth continuous stream, into a large volume of cold water that is vigorously stirred during the transfer. The goal of proper fritting is to obtain a glass that is cooled so rapidly that it has not had time to relieve internal stresses before it solidifies. Glass frit in this highly stressed condition is friable and easy to grind or ball mill. In contrast, a glass that has cooled slowly and annealed is extremely difficult to ball mill.

After the fritting, water is poured off. The frit is transferred to an aluminum pan, where it is dried at approximately 100° C. in an electric oven.

When completely dry, the frit is measured in 175 ml portions, transferred to an analytical mill and ground for 40 second intervals. After each cycle the frit is dry sieved through a 40 mesh sieve. The glass retained on the sieve is added back to the mill with any unground frit for further processing. Minus 40 mesh glass is either used for ball milling or set aside to be included as raw batch when the glass is smelted again.

Dry pre-sized frit is weighed and transferred to a one liter alumina jar mill charged with high density ½" diameter alumina balls. Appropriate mill additions are added to obtain a slip yielding good suspension of the ground glass particles and having Theological properties suitable for the intended method of application which may be spraying, dipping or flow coating.

Metal particulate additions are selected based on the metal substrate to be coated. For ferrous substrates, aluminum particles of about −200 mesh have been incorporated into the coating in amounts from 15 to 60 weight percent. Adhesion and flexibility was developed at a 40% loading. The weight percent is calculated by:

$$\frac{\text{Weight of Free } Al}{\text{Weight of Free } Al + \text{Weight of Frit}}$$

For example, a 41 weight percent would be about 100 parts of frit and 70 parts of aluminum powder, or 70/170 =41%. In that case, the weight percent approximates the volume percent, since the frit and aluminum densities are nearly equal.

Presence of fluorine, either smelted into the frit or added as a mill addition (such as fluorospar—$CaF_2$), results in a more reactive coating with bubbles and a porous, rough surface. Even more importantly, the fluorine-containing coatings do not develop an FeAl layer at the substrate coating interface.

The new coating substantially differs from other enamel coatings in terms of microstructure, frit chemistry and function. The ductility of the metallic phase provides coating flexibility and impact resistance, while the reactivity of the metallic phase can provide both adhesion and corrosion protection. The glass, or ceramic phase, provides heat resistance and functions as a barrier to corrosion. Furthermore, those coatings can be formulated to develop adhesion to ferrous substrates using frits free of conventional bonding oxides, such as cobalt oxide, nickel oxide or copper oxide. The formation of a FeAl layer is responsible for adhesion, for flexibility and for corrosion protection in addition to the barrier protection of the glass.

Particle size distribution, ratio of frit to aluminum, frit chemistry and firing temperatures may be varied to optimize performance/cost tradeoffs. For example, use of more than 40% Al may offer little increased benefits when compared to increased costs. Fineness of aluminum powder is important, but a powder with 75%–90% −325 mesh and 10%–25% −200 +325 mesh works well and is less expensive than 90%–99% −325 mesh powders. Other metals (i.e. magnesium, zinc, copper, manganese) may be equally effective at producing a composite coating with adhesion, environmental resistance, flexibility, impact resistance, or a combination of those characteristics. Those performance cost tradeoffs are also based on the end use of the product. As a flexible groundcoat for porcelain enamel applications, corrosion and high temperature resistance are not required, so coating composition and processing variables can be optimized to produce adhesion, reduce costs, maintain compatibility with cover coats, enhance flexibility and improve impact resistance. Where high temperature environmental protection is required, such as in heat exchangers or exhaust components, more refractory and corrosion resistant frit and metal compositions must be selected.

In one example, a substrate is coated with the frit, metal and clay mixture, which is heated and fused. The resulting coating is flexible and deforms with the substrate without delaminating or chipping. The coating is prepared by crushing, sieving, mixing and melting the frit components. The melt is tested by pulling, cooling and feeling a thread. The melt is fritted by pouring into moving water. The frit is dried, ground and sieved, and then wet milled with water, clay, bentonite and pH adjustors as a slip. Fine metal powder is added and mixed after the wet milling. Flowability of the slip is adjusted with water for the desired coating process, for example spraying.

Steel panels are cleaned and spray coated with the frit, metal powder and clay mixture. The coating is dried, and then fired or baked, to provide the metal-ceramic composite flexible corrosion prevention coating.

The invention provides new frit as a raw material, dry and wet slip formulas containing the frit, frit-slip-metal coating compositions, pre-ground frit, mill additions and powdered metal combinations for mixing in a slip, processes for preparing the coating composition, stock material, substrates and products coated with the coatings.

Typical frit and mill formulas are shown in Tables 1 and 2, respectively.

TABLE 1

TYPICAL COMPOSITION RANGE OF TESTED FRITS

| | Parts by weight | |
|---|---|---|
| OXIDE | Low | High |
| $Li_2O$, $Na_2O$, $K_2O$ | 6 | 26 |
| MgO, CaO, BaO | 6 | 24 |
| ZnO | 2 | 4 |
| $B_2O_3$ | 8 | 20 |
| $Al_2O_3$ | 0 | 4 |
| $SiO_2$ | 25 | 45 |
| $TiO_2$, $ZrO_2$ | 0 | 20 |
| $P_2O_5$, $V_2O_5$ | 0 | 2 |
| $Sb_2O_3$, $Fe_2O_3$, $MnO_2$ | 0 | 6 |
| CoO, NiO, CuO | 0 | 6 |
| F | 0 | 3 |

TABLE 2

TYPICAL MILL FORMULA

| MATERIAL | Parts by Weight |
|---|---|
| Frit | 100 |
| Clay | 7 |
| Bentonite | 0.25 |
| Boric Acid | 0.375 |
| Magnesium Carbonate | 0.25 |
| Water | 45 |

An example of a conventional Porcelain Enamel (PE) wet mill formula for wet spraying expressed on the basis of 100 parts by weight of frit is:

| Frit | 100 | Primary PE component |
|---|---|---|
| Clay | 7 | Primary suspending agent |
| Bentonite | 0.25 | Suspending agent, affects drain |
| Magnesium Carbonate | 0.25 | Electrolyte, affects set |
| Sodium Nitrite | 0.06 | Electrolyte, affects set |
| Borax | 0.375 | Affects set and acts as buffer |
| Water | 45 | Suspension Medium |

For aluminum/ceramic composite coatings, a special pH buffered mill formula is required. In higher pH environments aluminum reacts readily with water, generating heat and hydrogen gas. In one example of a formulation for mixing with aluminum powder, frit is milled in a boric acid based formula. At a second stage, aluminum is blended with the resultant slip after milling. Wet milling of aluminum powder in a closed ball mill could generate excessive amounts of explosive gases, and should not be attempted without prior safety measures. Therefore, mixing the aluminum with the slip after milling is the preferred method of processing. The typical boric acid formula is shown in Table 2.

| Frit | 100 |
|---|---|
| Clay | 7 |
| Bentonite | 0.25 |
| Boric Acid | 0.375 |
| Magnesium Carbonate | 0.25 |
| Water | 45 |

An example of boric acid formulation is:

The formulations yield slips with a specific gravity of approximately 1.7. In preferred examples slips are ground to a common porcelain enamel fineness specification of "7% on 200 mesh".

A standard laboratory size panel for preparing specimens is 4"×6". The steel composition and thickness may vary, but most work is done with either enameling grade decarburized "Univit" or "Q Panel" polished cold rolled steel. Usually both of these steels are in approximately 20 gauge thickness. "Q Panels" are supplied pre-cleaned and wrapped in a rust inhibitor treated paper. After unwrapping the Q Panels, they require no further treatment and may be sprayed as is. On the other hand, steel obtained directly from the manufacturer is not pre-cleaned and is often treated with a light film of oil to retard rust. Those Univit panels are scrubbed with a mild alkaline detergent such as Simple Green to a point of no water break. When the panel is immersed in or flooded with water the water flows off uniformly, leaving a continuous wet film with no breaks over the entire surface. That is primarily a check for oil residue, which if present will cause water to break up and bead on the surface. After cleaning, each panel is rinsed thoroughly with water, drained, dried with a blast of compressed air, stacked in 25 panel units and wrapped in protective paper.

First the enamel slip is adjusted to proper spraying consistency. That is judged mainly by trial and experience. If large amounts of slip are available and large numbers of specimens are needed, the slip may be adjusted to an optimum specific gravity and then set-up to obtain optimum application properties by adding various electrolytes. The time required for an enamel slip to drain from a standard panel to the first break in the drain stream is the most often used set-up specification. Drain time is periodically checked during commercial flow coating and dipping operations. Optimum time limits are derived from experience. Drain time may be shortened by adding electrolytes that flocculate the clay particles or may be lengthened by adding water, if the specific gravity has drifted too high due to evaporation. Drain time can also be lengthened by adding electrolytes that deflocculate clay, if the set has drifted high.

One method of adjusting viscosity consists of first checking flow from a spatula and adding either water or electrolytes if the set was obviously too high or too low. Next a test specimen is sprayed. The spray pattern is observed, as is the condition of the sprayed enamel on the panel. Enamel should spray uniformly with no spitting or sputtering, and it should wet-out well on the panel but not to the point where it runs.

Minor adjustments are made by simply adding reagents to the spray mixture.

When acceptable spray characteristics are obtained, a steel panel is tared and positioned in a spray jig inside a spray booth. Enamel is sprayed on the sample panel using smooth uniform passes from left to right and from top to bottom while counting the number of passes. When it is thought that the required weight has been applied, the panel is weighed. If the weight exceeds the desired limits, the enamel is washed off and the panel is dried and re-sprayed. If the weight is below the limit, additional enamel is applied in short rapid passes, reweighing and re-spraying until the proper weight is obtained. Usually the weight applied can be judged fairly accurately after one panel has been sprayed. The normal application weight is between one and three grams per 4"×6" panel for ground coats, and four to six grams for cover coats or one coat enamels. The industry uses a hybrid system specifying grams per square foot for measuring enamel application rates. The range normally covered is from 6 grams per square foot (1g/4"×6" panel) to 36 grams per square foot (6g/4"×6" panel).

After spraying, the panels are dried by laying them horizontally on a steel screen in an electric oven at 100° C.

After drying, the specimens are fired in an electric furnace measuring approximately 7 inches high by 13 inches wide by 10 inches deep, containing a firing rack constructed of high temperature stainless steel. The furnace is pre-heated at the desired firing temperature long enough to uniformly heat the refractories and minimize temperature recovery time when a sample is inserted.

Samples are introduced into the furnace by means of a two-tined fork made of 3/16" mild steel rod. Tines are four inches apart and 12 inches long. Two 4"×6" panels may be fired at a time. The samples are inserted quickly and the door is shut, after which a timer pre-set to the desired firing time is started. Four minute firing time is the norm for 20 gauge panels. The furnace usually takes from 2 to 2.5 minutes to fully recover, therefore the actual time-at-temperature is between 1.5 to 2 minutes. After firing, the samples are removed from the furnace and cooled in air on a metal rack.

Coated substrates result that are bendable and impactable without delaminating the coatings. A fine layer of aluminum migrates to the steel and may be found on the steel surface as a Fe/Al interface. When the coated steel is distressed to chip the coating and destroy the barrier glass protection, galvanic action corrosion prevention by the aluminum coating protects the steel.

The new coatings have many uses. One example of the use of the coatings are chip-resistant and corrosion protected appliances. Another example is coated steel mufflers, in which the barrier coatings protect against corrosion. The reparability of the coatings are an important feature.

EXAMPLE 1

Frit was prepared by smelting the raw materials listed in Table 3 at a temperature of 1200–1250° C. and then water quenching as described previously. The resultant oxide compositions are listed in Table 3. The frit was then mixed with the materials shown in Table 4 and were ground in a jar mill until less than 8% of the solids in the slip was retained on a 200 mesh sieve. The mill contents were then dumped onto a 40 mesh sieve to separate the slip from the grinding media and any coarse particles.

TABLE 3

| FRIT #'s → | G-0090 | G-0091 | G-0092 | G-0114 | G-0115 |
|---|---|---|---|---|---|
| Batch Formulas (grams) Raw Material | | | | | |
| Alumina | 7.18 | 7.07 | 7.18 | 6.68 | 7.31 |
| Borax, 5 mole | 65.77 | 64.73 | 65.77 | 61.17 | 66.94 |
| Soda Ash | 21.03 | 20.70 | 21.03 | 19.56 | 21.04 |
| Potash | 2.32 | 2.28 | 2.32 | 2.15 | 2.36 |
| Lime | 37.57 | 36.98 | 37.57 | 34.95 | 38.24 |
| Silica | 56.89 | 55.99 | 56.89 | 52.91 | 57.90 |
| Zirconia | 11.92 | 11.74 | 11.92 | 11.09 | 12.14 |
| Cobalt Oxide | | | | | |
| Nickel Carbonate | | 7.27 | | 18.96 | |
| Zinc Oxide | 5.56 | 5.47 | 5.56 | 5.17 | 5.65 |
| Manganese IV Oxide | | | 3.86 | | |
| Monosodium Phosphate | 3.92 | 3.86 | 3.92 | 3.64 | 3.99 |
| Antimony Trioxide | 3.86 | | | | |
| Sodium Nitrate | 3.99 | 3.93 | 3.99 | 3.71 | 4.06 |
| TOTAL BATCH WEIGHT | 220.01 | 220.02 | 220.01 | 219.99 | 219.63 |
| Resultant Oxide Compositions | | | | | |
| Na2O | 16.86 | 16.85 | 16.86 | 16.20 | 17.25 |
| K2O | 0.93 | 0.92 | 0.92 | 0.89 | 0.95 |
| CaO | 12.34 | 12.34 | 12.34 | 11.86 | 12.62 |
| ZnO | 3.26 | 3.26 | 3.26 | 3.13 | 3.33 |
| B2O3 | 18.44 | 18.44 | 18.44 | 17.72 | 18.86 |
| Al2O3 | 4.28 | 4.28 | 4.28 | 4.11 | 4.38 |
| SiO2 | 33.23 | 33.22 | 33.23 | 31.94 | 34.00 |
| TiO2 | 0.03 | 0.03 | 0.03 | 0.03 | 0.03 |
| ZrO2 | 6.99 | 6.99 | 6.99 | 6.72 | 7.15 |
| P2O5 | 1.36 | 1.36 | 1.36 | 1.31 | 1.39 |
| MnO2 | | | 2.26 | | |
| Fe2O3 | 0.03 | 0.03 | 0.03 | 0.03 | 0.03 |
| CoO | | 0.02 | | 0.06 | |
| NiO | | 2.26 | | 6.00 | |
| N2O5 | 1.46 | 1.46 | 1.46 | 1.40 | 1.49 |
| Sb2O3 | 2.24 | | | | |
| TOTAL | 99.99 | 100.00 | 100.00 | 100.00 | 99.99 |

TABLE 4

| | MILL # | | | | |
|---|---|---|---|---|---|
| Material | M0260 | M0261 | M0262 | M0263 | M0267 |
| G0090 | | 300 | | | |
| G0091 | | | 300 | | |
| G0092 | | | | | 300 |
| G0114 | | | | 300 | |
| G0115 | 300 | | | | |
| Clay | 21 | 21 | 21 | 21 | 21 |
| Bentonite | 0.75 | 0.75 | 0.75 | 0.75 | 0.75 |
| Boric Acid | 1.125 | 1.125 | 1.125 | 1.125 | 1.125 |
| Magnesium Carbonate | 0.75 | 0.75 | 0.75 | 0.75 | 0.75 |
| Water | 140 | 140 | 140 | 140 | 140 |
| Al Concent. | 40% | 40% | 40% | 40% | 40% |

A portion of the above slips were mixed with aluminum powder and water, as shown in Table 5, using a rotary mixer. The slips were sprayed onto 4"×6" ferrous substrates in wet weights ranging from 5.5 g to 6.5 g per panel. The 20 gauge decarburized steel substrates had been previously washed with an alkali cleaner (to remove dirt and oils), rinsed with water and dried. The coated panels were dried at about 100° C. in a forced air electric dryer for approximately 10 minutes and then fired in an electric kiln at 780° C. for 4 minutes. The furnace required 2 to 2 ½ minutes to recover to set point temperature after opening the door and inserting the panel (s), therefore the actual time at the peak firing temperature was 1 ½ to 2 minutes. The firing process yielded a hard, adherent, matte and gray colored, rough surface coating.

Adherence and impact resistance of the panels was measured using the PEI 5 lb. drop weight method, which deformed the coated substrate. The results are included in Table 5. A class 5 adherence was noted for all panels, except the coating (M0292) containing the frit (G0091) with 2.25 weight percent NiO. It is particularly noteworthy that panels M0290 exhibited excellent adhesion and deformability, while the frit (G0115) in M0290 was free of conventional porcelain enamel bonding oxides, cobalt, nickel and copper. The coating actually deformed with the substrate, and remained adherent, for all specimens except M0292.

The same panels were also bent 90° around a 1" diameter mandrel. The coating remained adherent during bending, except for minor chippage at the extreme edges of the panel. No chippage or delamination was observed beyond 1/8" from the edges using the naked eye. Under microscopic observation (40×), small cracks were detectable in the coating, but the coatings did not delaminate or chip off of the substrate. These panels were also cut on a high speed (3450 rpm) table saw using a 7"×1/8" Metal Cutting Wheel, without any chipping observed.

Heat resistance tests were performed on the coated panels in accordance with MIL-P-14105D for 16 hours at 200° C. and at 400° C. No changes in appearance or adherence was detected after high temperature exposure.

Salt spray testing was performed in accordance with ASTM B117 on the coated panels, as well as the heat

TABLE 5

| | Mill # | | | | |
|---|---|---|---|---|---|
| Material | M0290 | M0291 | M0292 | M0293 | M0297 |
| M0260 (G0115) | 200 | | | | |
| M0261 (G0090) | | 200 | | | |
| M0262 (G0091) | | | 200 | | |
| M0263 (G0114) | | | | 200 | |
| M0267 (G0092) | | | | | 200 |
| Alcoa 101 Aluminum | 86.3 | 86.3 | 86.3 | 86.3 | 86.3 |
| Water | 40 | 40 | 40 | 40 | 40 |
| Al Concent. | 40% | 40% | 40% | 40% | 40% |
| FIRING RESULTS-BOND** | | | | | |
| 793 C | 5 | 5 | 2 | 5 | 5 |
| 793C (2) | 5 | 5 | 2 | 5 | 5 |
| | Deformed with sustrate & remained adherent | Deformed with sustrate & remained adherent | Deformed partially with sustrate & delaminated over 30-50% of impact area | Deformed with sustrate & remained adherent | Deformed with sustrate & remained adherent |
| 4.4.10.1 of MIL-P-14105D Test Results-BOND | | | | | |
| after 200 C | 5 | 5 | 5 | 5 | 5 |
| after 400 C | 5 | 5 | 1 | 5 | 5 |
| after 400 C, before SS | 5 | 5 | 1 | 5 | 5 |
| 4.4.10.1 of MIL-P-14105D Test Results-APPEARANCE | | | | | |
| after 200 C | NC | NC | NC | NC | NC |
| after 400 C | NC | NC | NC | NC | NC |
| after 400 C, before SS | NC | NC | NC | NC | NC |
| SALT SPRAY TEST-All Panels exhibited minimal pinhole rust & No Undercutting, see other results below. | | | | | |
| | Results were generally consistent over the three panels tested for each formula. | | | | |
| Sample 1 | Slight Rust in scribe area & on Edges, No rust in Impact area | NO Rust in scribe, edges or impact area | Exposed metal in impact area-Slight Rust in scribe, edges & impact area | NO Rust in scribe, edges or impact area | NO Rust in scribe, edges or impact area |
| Sample 2 | Slight Rust on Edges, No rust in impact area or in scribe | NO Rust in scribe, edges or impact area | Exposed metal in impact area-Slight Rust in scribe, edges & impact area | NO Rust in scribe, edges or impact area | NO Rust in scribe, edges or impact area |
| 400 C (HR) | Slight Rust on Edges, No rust in impact area or in scribe | NO Rust in scribe, edges or impact area | Exposed metal in impact area-Slight Rust in scribe, edges & impact area | NO Rust in scribe, edges or impact area | NO Rust in scribe, edges or impact area |

**Six Panels were sprayed for each coating:
1 Panel for Bond Test & Appearance Only
1 Panel for 200 C HR
1 Panel for 200/400 C HR
1 Panel for 400 C HR & Salt Spray
2 Panels for Salt Spray Test
KEY: NT = Not tested  NC = No Change in Appearance  NA = Not Applicalbe  SS = Salt Spray  HR = Heat Resistance resistance tested panels. Duplicate specimens were tested for each of the 5 coatings, plus the heat resistance panels. Minimal rusting was observed on the panels; some panels exhibited no rust. The results were consistent over all three specimens tested for each coating composition. Most notable was that the poor adhesion coating (M0292), which produced a substantial area of exposed substrate, exhibited only minimal rusting, This indicates that the coating, or coating/substrate reaction products, provide corrosion inhibition, cathodic protection, or both mechanisms of protection to the steel substrate, in addition to barrier protection.

EXAMPLE 2

Frits G0104 and G0105 were prepared as described in Example 1. Raw material and oxide formulas are shown in Table 6. Slips were prepared, panels were sprayed and fired, and fired specimens were evaluated using the procedures listed in example 1. The mill formulations, process conditions and results are provided in Table 7. Both samples produced a class 5 bond, however, the Fluorine containing frit (GO104) formula (M0215) yielded a more brittle coating, which chipped off of the metal substrate in the impact area similar to conventional porcelain enamel bond frits. Furthermore, the fired microstructure was extremely porous, and the adhesion between the metallic particles and glass particles was very weak. It was possible to scrape portions of coating M0215 off with a fingernail. The fluorine free frit (G0105) formula (M0216) deformed with the substrate and remained adherent in the bond impact area. In the 1" mandrel test, the fluorine free coating proved more ductile.

Both specimens were heat resistance tested to 200° C. and exposed to salt spray as described in Example 1. No change in surface appearance or adhesion was noted after heat resistance and the salt spray exposure caused minimal rusting on either panel. The fluorine containing coating showed a detectably greater amount of rusting, perhaps due to the greater amount of porosity and loose adhesion between coating particles. However, since only one panel of each composition was tested, the difference could not be confirmed.

TABLE 6

| FRIT #'s → | G0104 | G0105 |
|---|---|---|
| Batch Formulas (grams) Raw Material | | |
| Borax, 5 mole | 31.61 | 31.50 |
| Soda Ash | 37.49 | 43.35 |
| Lime | | 8.97 |
| Silica | 74.77 | 78.01 |
| Spodumene | 3.88 | 3.87 |
| Sodium Silicofluoride | 10.54 | |
| Fluorospar | 7.20 | |
| Zirconia | 29.14 | 29.03 |
| Cobalt Oxide | 1.98 | 1.98 |
| Rutile | 6.21 | 6.18 |
| Zinc Oxide | 3.10 | 3.09 |
| Lithium Carbonate | 9.64 | 9.61 |
| Sodium Nitrate | 4.43 | 4.42 |
| TOTAL BATCH WEIGHT | 219.99 | 220.01 |
| Resultant Oxide Compositions | | |
| Li2O | 2.33 | 2.33 |
| Na2O | 18.71 | 18.73 |
| CaO | 2.80 | 2.80 |
| ZnO | 1.72 | 1.72 |

TABLE 6-continued

| FRIT #'s → | G0104 | G0105 |
|---|---|---|
| B2O3 | 8.38 | 8.38 |
| Al2O3 | 0.67 | 0.67 |
| SiO2 | 44.62 | 44.62 |
| TiO2 | 3.49 | 3.49 |
| ZrO2 | 16.17 | 16.16 |
| Fe2O3 | 0.05 | 0.04 |
| CoO | 1.06 | 1.06 |
| NiO | 0.01 | 0.01 |
| F | 3.19 | |
| N2O5 | 1.53 | 1.53 |
| TOTAL | 100.01 | 100.01 |

TABLE 7

| Material | M0204 | M0205 | M0215 | M0216 |
|---|---|---|---|---|
| G0104 | 300 | | | |
| G0105 | | 300 | | |
| M0204 | | | 80 | |
| M0205 | | | | 80 |
| Clay | 21 | 21 | | |
| Betonite | 0.75 | 0.75 | | |
| Boric Acid | 1.125 | 1.125 | | |
| Magnesium Carbonate | 0.75 | 0.75 | | |
| Water | 135 | 135 | 15 | 15.0 |
| Alcoa 101 Aluminum | | | 34.7 | 34.7 |
| Approximate Aluminum Concentration | | | 40% | 40% |
| Mill Grind | | | | |
| FIRING RESULTS - BOND | | | | |
| 760 C | ▓▓▓ | ▓▓▓ | | |
| 793 C | ▓▓▓ | ▓▓▓ | 5 | 5 |
| 793 C (2) | ▓▓▓ | ▓▓▓ | 5 | 5 |
| Gray Color | ▓▓▓ | ▓▓▓ | Dark | Light |

Surface Quality Good for all Samples - Varying shades of gray, all samples matte finish 4.4.10.1 of MIL-P-14105D Test Results - BOND

| | | | | |
|---|---|---|---|---|
| 200 C | ▓▓▓ | ▓▓▓ | NC | NC |

4.4.10.1 of MIL-P-14105D Test Results - APPEARANCE

| | | | | |
|---|---|---|---|---|
| 200 C | ▓▓▓ | ▓▓▓ | 5 | 5 |

SALT SPRAY TEST

| | | | | |
|---|---|---|---|---|
| ASTM B117 - 166 Hours | ▓▓▓ | ▓▓▓ | Med Pinhole Rust & Stains, Some rust bond areas | Light Pinhole Rust, No rust in bond or scribe areas |

One coated substrate of each composition was cut on a slow speed laboratory diamond saw and mounted to produce cross-sections for microscopic analysis. A two part epoxy/resin hardener was used and polishing was achieved on a 12" variable speed wheel. SiC grinding paper of 120 grit and 600 grit were used, followed by diamond paste polishing at 15, 6, and 1 $\mu$m. Final polishing was done with an aqueous dispersion of 0.05 $\mu$m aluminum oxide. The specimens were ultrasonically cleaned between steps, rinsed with distilled water and air dried. The final rinse included and alcohol rinse to displace the water, followed by a 1 minute etch in picric acid to accentuate the steel substrate grains. The specimens were observed with optical and scanning electron microscopy with energy dispersive spectroscopy (SEM/EDS). Discrete areas of glass, metal particulate and the underlying substrate were evident in both specimens. This included the dissolution of iron oxide into the glass near the coating/substrate interface. Both specimens had porosity, however, the fluorine specimen showed a larger amount and larger areas of porosity. The fluorine free specimen contained an additional phase at the interface, which was identified as an FeAl phase using SEM/EDS. This phase was not observed in the Fluorine free specimen.

In further tests at TPI's laboratories, other frits were smelted both with and without fluorine, and the absence of This example indicates that the coatings exhibit adhesion and some deformability over a range of aluminum metal concentrations, however, deformability does not necessarily improve due to an increase in the ductile metal powder concentration in the mill formula. The interaction between the frit, metal and substrate during firing affect the microstructure and resultant deformability.

TABLE 8

| Material | MILL # | | | | | | |
|---|---|---|---|---|---|---|---|
| | M0202 | M0206 | M0211 | M0267 | M0297 | M0307 | M0308 |
| G0090 | 300 | | | | | | |
| M0202 (G0090) | | 100 | 50 | | | | |
| M0206 (G0090 + Al) | | | 5 | | | | |
| G0092 | | | | 300 | | | |
| M0267 (G0092) | | | | | 200 | 150 | |
| M0307 (G0092 + Al) | | | | | | | 184 |
| Clay | 21 | | | 21 | | | |
| Bentonite | 0.75 | | | 0.75 | | | |
| Boric Acid | 1.125 | | | 1.125 | | | |
| Magnesium Carbonat | 0.75 | | | 0.75 | | | |
| Alcoa 101 Aluminum | | 43.4 | 33.2 | | 86.3 | 97.1 | 25.8 |
| Water | 135 | 20 | 14 | 135 | 40 | 25 | 15 |
| Al Concent. | —— | 40% | 50% | —— | 40% | 50% | 60% |
| FIRING RESULTS - BOND** | | | | | | | |
| 793 C | —— | 5 | 5 | —— | 5 | 5 | 5 |
| 793 C (2) | —— | 5 | 5 | —— | 5 | 5 | 5 |
| Impact Area Results | | Deformed with sustrate & remained adherent | Deformed with sustrate & remained adherent | | Deformed with sustrate & remained adherent | Deformed with sustrate & remained adherent | Deformed with sustrate & remained adherent |
| 1" Mandrel Bend Test Results | | | | | | | |
| | | Slight edge chippage (1/8"). No cracking | No visual chippage or cracking | | No visual chippage or cracking | Med. edge chippage (1/4"). Multiple cracks | Edge chippage (1/4"). Multiple cracks & minor delamination | the FeAl phase at the interface for fluorine containing coatings was again observed. Similarly, the loose adherence between glass and metal particulate was noted.

EXAMPLE 3

Frits, slips and coated panels were prepared in accordance with the procedures in Example 1. In this test, however, the concentration of aluminum particulate was varied from 40 to 60%. The frit formulas are shown in Table 3, and the mill formulas and results are provided in Table 8. After firing the coatings containing frit G0090, it was observed that M0211 (50% metal) exhibited greater deformability as tested on the 1" mandrel. The 40% metal coating (M0206) showed an edge chipping of less than ⅛ but no edge chipping occurred in the 50% metal coating. Both specimens deformed and remained adherent in the bond impact area.

For coatings containing G0092, the opposite trend was observed. Higher concentrations of Aluminum metal resulted in more cracks in the coating when bent around the mandrel. However, like the G0092 coatings, all three specimens deformed and remained adherent in the bond impact area.

EXAMPLE 4

Frits, slips and coated panels were prepared in accordance with the procedures in Example 1. In this test, however, different metal particulate and several substrates were evaluated. The metals included Aluminum, Nickel, Boron and Zinc, while the substrates included UNIVIT (decarburized steel), Stainless Steel Grade T409 and T125 Aluminized T409 Stainless Steel. The frit formulas are shown in Table 3, and the mill formulas and results are included in Table 9.

The Nickel/Aluminum particulate combination (M0310) produced results similar to the pure aluminum coating (M0317) on UNIVIT substrates. After firing, they both remained adherent and deformed with the substrate, but minor chippage occurred for M0310 during the mandrel bend test. The M0310 surface was also darker than the aluminum coating. None of the coatings tested exhibited good adhesion to SS T409, however, the addition of Boron (M0318) appeared to improve adhesion. Both the Aluminum (M0317) and Aluminum/Boron combination (M0318) with Frit G0091 exhibited excellent adhesion and deformability on Aluminized Steel. The Zinc coating (M0319) produced a glossy and blistered surface on both UNIVIT and SS T409. This behavior likely occurred due to the low melting temperature of zinc, particularly with respect to the frit.

light to dark gray depending on the amount of time the area was heated. However, in all cases, the coated panels exhibited a class 5 bond and they deformed and remained adherent after impact.

TABLE 9

| Material | MILL # | | | | | |
|---|---|---|---|---|---|---|
| | M0267 | M0310 | M0262 | M0317 | M0318 | M0319 |
| G0115 | 300 | | | | | |
| M0260 (G0115) | | 80 | | | | |
| G0091 | | | 300 | | | |
| M0262 (G0091) | | | | 300 | | 100 |
| M0317 (G0091 + Al) | | | | | 100 | |
| Clay | 21 | | 21 | | | |
| Bentonite | 0.75 | | 0.75 | | | |
| Boric Acid | 1.125 | | 1.125 | | | |
| Magnesium Carbonate | 0.75 | | 0.75 | | | |
| Alcoa 101 Aluminum | | 34.9 | | 130.0 | | |
| Inco 287 Nickel | | 4.5 | | | | |
| Boron Power | | | | | 0.5 | |
| Zinc 1222 | | | | | | 43.0 |
| Water | 135 | 15 | 135 | 60 | 2 | 20 |
| Al Concentration | | 40% | | 40% | 40% | |
| Nickel Concentration | | 5% | | | | |
| Boron Concentration | | | | | 1% | |
| Zinc Concentration | | | | | | 40% |
| FIRING RESULTS - BOND** | | | | | | |
| 793 C UNIVIT | | 5 | | 5 | 5 | 0 |
| 793 C SS T409* | | | | 0 | 1 | 0 |
| 793 C SS T409 Al** | | | | 5 | 5 | |
| Impact Area Results | | Deformed with sustrate & remained adherent | | UNIVIT-deformed with sustrate & remained adherent SS T409 chipped | UNIVIT & SS T409AL-deformed with sustrate & remained adherent SS T409 chipped | Entire coating chipped in impact area & left shiny metal |
| General Surface Appearence | | | | | | |
| | | Dark Gray, Matte Surface. | | Light–Med Gray, Matte Surface. SS T409 substrate appeared more porous | Med–Dark Gray, Matte Surface. Both 409 substrates appeared more porous | Med to large blisters, Light Gray and Glossy surface |
| 1" Mandrel Bend Test Results - UNIVIT | | | | | | |
| | | Slight edge chippage (1/8"). Minor cracking | | No visual chippage or cracking | Med. edge chippage (1/4"). Minor cracking, no delamination | Edge chippage (1/4"). Multiple cracks, but no delamination |

*SS T409 = 16 gauge Stainless Steel Grade T409
**SS T409 Al = 20 gauge T125 Aluminized Stainless Steel Grade T409

EXAMPLE 5

Frits, slips and sprayed panels were prepared in accordance with the procedures in Example 1. In this test, however, firing of the coated part was not carried out in a furnace. UNIVIT panels were coated with formula M0314, air dried for about 30 minutes, then "fired" using a hand held propane torch. The panels were heated by passing the flame across either the back (uncoated) side or the front (coated) side of the panels. Both methods were equally effective. Some slight warpage of the panels was noted where uneven heat was applied, and the color of the coating varied from While the invention has been described with reference to specific examples and embodiments, modifications and variations of the invention may be constructed without departing from the scope of the invention, which is defined in the following claims.

We claim:

1. A coated ferrous product, comprising a ferrous substrate coated with an electrically conductive coating composition for providing corrosion resistance on the ferrous substrate and for adhesion through aluminum-iron-frit reactions at firing temperature at about 750° C., the coating composition comprising a smelted and milled frit of less than about 200 mesh size having by weight about 40% $SiO_2$, about 17% $Na_2O$, about 18% $B_2O_3$, about 12% CaO, about 4% $Al_2O_3$, and balance other metal oxides, fine aluminum powder about 40% by weight of the frit and aluminum powder mixture total, clay in about 4% by weight of the milled frit and aluminum mixture, and bentonite, boric acid, magnesium carbonate in less than 1% by weight of the milled frit and aluminum mixture and water in about 50% by weight of the milled frit and aluminum mixture for mixing with the balance of the composition before coating for providing corrosion resistance on the ferrous substrate and for adhesion through aluminum-iron-frit reactions at firing temperature at about 750° C.

2. A coated ferrous product, comprising a ferrous substrate coated with an electrically conductive coating composition, comprising a smelted and milled frit of less than about 200 mesh size having by weight:

about 33% $SiO_2$ about 17% $Na_2O$ about 18% $B_2O_3$ about 12% CaO about 7% $ZrO_2$ about 4% $Al_2O_3$ and balance other metal oxides, and fine aluminum powder about 40% by weight of the combined frit aluminum powder mixture, comprising clay in about 4% by weight of the milled frit and aluminum powder mixture, and bentonite, boric acid, magnesium carbonate in less than 1% by weight of the milled frit and aluminum powder mixture.

3. A coated ferrous product, comprising a ferrous substrate coated with an electrically conductive aqueous coating composition for aqueous spraying and dipping on a metal substrate, comprising a smelted and milled combined metal oxide minus 200 mesh frit having major components of $SiO_2$, $B_2O_3$ and $Na_2O$, and other minor components of oxides, about 40% fine metal aluminum powder combined with about 4% clay and less than 1% boric acid, bentonite and magnesium carbonate and about 50% water by weight compared to the frit and aluminum powder mixture mixed for forming a slurry prior to spraying or dipping and drying and firing the coating composition at about 750° C.

4. A coated ferrous product, comprising a ferrous substrate coated with an electrically conductive aqueous coating composition for aqueous spraying and dipping on a metal substrate, comprising a smelted and fritted combined metal oxide −200 mesh frit having major components of $SiO_2$, $B_2O_3$ and $Na_2O$, and other minor components of oxides, about 40% fine aluminum powder by weight of the combined frit and aluminum powder mixture combined with about 4% clay and less than 1% boric acid, bentonite and magnesium carbonate by weight of the combined frit and aluminum powder mixture.

5. The method of providing coated ferrous substrate articles, comprising cleaning the articles by degreasing and spraying or dipping the substrates in an aqueous slurry of the coating composition described in claim 4, and drying and firing the coating composition at about 750° C.

* * * * *